… … …

United States Patent Office 2,715,639
Patented Aug. 16, 1955

2,715,639

PRODUCTION OF STEROLS FROM TALL OIL PITCH

Hans Albrecht, Stamford, Conn., and Richard Herrlinger, Roselle Park, N. J., assignors to American Cyanamid Company, New York, N. Y., a corporation of Maine No Drawing. Application July 28, 1953,
Serial No. 370,854

10 Claims. (Cl. 260—397.25)

The present invention relates to improved methods of recovering sterols from tall oil pitch and, more particularly concerns the production of beta-sitosterol from such a source.

Sterols are solid, crystalline, alcoholic substances of biological importance found in the non-saponifiable matter of plants and animals. They are complex, cyclic compounds containing 27–30 carbon atoms and are characterized structurally by the presence of a phenanthrene ring system having an additional fused five-member ring, and are more technically termed hydroxylated perhyro-1,2-cyclo-penteno-phenanthrene derivatives.

Sterols derived from animal origin have, until recently, been used in the production of male and female sex and cortical hormones and were substantially the main source material therefor. However, during the last decade, it was discovered that less expensive and more readily available vegetable or plant steroids, such as diosgenin and stigmasterol, provide more practicable starting materials for the synthesis of these hormones. Beta-sitosterol, for example, the principal steroid of the pine tree, can also be used for this purpose, but, inasmuch as the synthesis is somewhat more complex than that employing stigmasterol, for example, it has not been accepted by the industry due to the economic disadvantages involved in the use of the more complex procedures.

It is, therefore, a principal object of the present invention to provide relatively inexpensive methods of producing beta-sitosterol whereby such a material, due to its resulting inexpensive nature, can compete with other sterols, in spite of its more complex processing.

Sitosterols or mixtures thereof are the most widely distributed of plant sterols, but individual constituents are secured only with difficulty. Generally, beta-sitosterol ($C_{29}H_{49}OH$) is the most common and most important of the sitosterols, although it is frequently accompanied by its isomers. Beta-sitosterol has been isolated from corn oil, wheat germ oil, cottonseed oil, rye germ oil, sarsaparilla root, and a number of other plant sources, but none of these provides a readily available source for the pure sterol. It is also known to be one of the major constituents of the commercially available sterols of soya-bean oil, but is a part therein of a very complex mixture containing many known and unknown sterols and its recovery is thus very difficult. Consequently, such sources thus far have not proved to be the answer to the problem involving the use of beta-sitosterol.

It is, therefore, another principal object of the present invention to provide an adequate source of and simple and relatively uncomplicated methods of recovery of sterols, particularly beta-sitosterol, in relatively pure form.

Beta-sitosterol has been isolated from the unsaponifiable portion of tall oil and such a source has been indicated to be a much more promising source than those previously mentioned. Investigations of such recovery methods, however, have left much to be desired. Extraction of the unsaponifiables from sulfate soap is made quite difficult by the ready formation of emulsions. Solvent extractions have proved of dubious commercial value due to the relative cost or scarcity of such solvents and to the intensive purification required to produce a pure product. Esterification processes have been attempted but the inclusion of contaminants has militated against the use of such processes.

It is, therefore, still another principal object of the present invention to provide simple methods of recovering sterols, particularly beta-sitosterols, from relatively inexpensive and available sources by methods which will be practicable and commercially acceptable.

We have discovered that such objects may be accomplished by saponifying tall oil pitch (a relatively inexpensive starting material) with an alcoholic potassium hydroxide solution comprising an alcohol having two or more carbon atoms and at least 20% excess potassium hydroxide with respect to the amount required to saponify the tall oil pitch, diluting the reaction mixture with hot water and then permitting the same to cool, preferably to room temperature. The precipitate which crystallizes out of the solution is crude sterol which may be filtered off, washed and dried.

Crude sterols produced by such methods are improved in color and content of ash and chloroform-insolubles by recrystallization from mixtures of methanol with benzene, toluene, or ethylene dichloride. Semi-refined sterols, white in color, are obtained in about 72–75% yields or greater, based on the crude sterols.

The predominant sterol present has been isolated and has been identified as beta-sitosterol, the properties of which are listed herewith:

Melting point _____ 138–140° C.
Optical rotation $[\alpha]_D^{25}$ _____ —36°
Melting point of derivatives:
    Acetate _____ 128–129° C.
    Benzoate _____ 146–147° C.
    3,5-dinitrobenzoate _____ 202–203° C.

It has been determined that the crude sterols contain approximately 70% or more beta-sitosterol and, consequently, it can be seen that such processes involving tall oil pitch provide an excellent and inexpensive source of sterols and particularly beta-sitosterol.

Tall oil pitch is the residue in the fractionation of tall oil and, although a widely varying composition, in general, possesses the followng estimated percentages of constituents:

| | Percent |
|---|---|
| Unsaponifiables | 32 |
| Rosin acids (free) | 22 |
| Rosin acids (esterified) | 8 |
| Fatty acids (free) | 6 |
| Fatty acids (esterified) | 23 |
| "Lignous" acids | 9 |
| | 100 |

The unsaponifiables normally consist of approximately 45% sitosterols, 15% aliphatic alcohols (mainly lignoceryl alcohol, $C_{24}H_{49}OH$) and undetermined amounts of other hydroxy compounds and hydrocarbons.

A typical analysis of one particular sample of tall oil pitch showed the following specifications:

Acid No. _____ 59.2
Saponification No. _____ 117.8
Iodine No. _____ 115.5

The alcohol employed in the preparation of the alcoholic potassium hydroxide solution which is used to saponify the tall oil pitch may be any aliphatic monohydroxy water-soluble alcohol having two or more carbon atoms. For the purposes of the invention, however, those alcohols having from two to six carbon atoms, such as ethanol, propanol, isopropanol, butanol, pentanol, hexanol, etc., are preferred.

The concentration of potassium hydroxide used in the preparation of the alcoholic caustic potash solution is necessarily at least 2% and may be as high as 13% and should contain at least 20% in excess of the theoretical amount required to saponify the tall oil pitch. Theoretically, any excess of KOH greater than 20% would be operative, but the upper limits of such a range would be dictated by economic factors. However, were the excess to be less than 20%, then a slower reaction takes place resulting in less complete saponification and a much less acceptable process results. This is shown by the following tests in which two separate 100-gram samples of tall oil pitch were saponified under reflux with 60% excess 2N ethanolic potassium hydroxide (22.4 g. of 88% KOH) and with 20% excess 2N ethanolic potassium hydroxide (16.5 g. of 88% KOH) respectively. The natural products were removed from the soap solution and the saponification numbers were determined to be 4.7 and 9.3 respectively. The use of potassium hydroxide in amounts less than 20% lead to even slower reactions and higher saponification numbers, rendering such a range commercially and practically undesirable.

The invention will be further illustrated in greater detail by the following specific examples. It should be understood, however, that although these examples may describe in particular detail some of the more specific features of the present invention, they are given primarily for purposes of illustration and the invention in its broader aspects is not to be construed as limited thereto.

*Example 1*

One thousand grams of tall oil pitch was saponified with 3 liters of 2N ethanolic potassium hydroxide solution (360 grams of 85% KOH and 2.8 liters of ethanol). The saponification took place at a temperature of approximately 50–55° C. and required about 7 hours. The resulting soap solution was a clear, homogeneous, dark brown, one-layer solution which was then diluted with 12 liters of hot water having a temperature of about 72° C. The temperature of the resulting diluted soap solution was then about 68° C. It was permitted to cool gradually to room temperature (22° C.) and then allowed to stand for an additional 25 hours. The precipitate which formed was filtered off and washed with 1 liter of a mixture of one part of ethanol and 3 parts of water. The filter cake was collected and dried at 70° C. and gave 125 grams of material, corresponding to a yield of 12.5%, as based on the tall oil pitch.

*Example 2*

One thousand grams of tall oil pitch was saponified with 3 liters of 2N ethanolic potassium hydroxide solution (360 grams of 85% KOH and 2.8 liters of ethanol) at reflux temperature for about 1.5 hours. The resulting one-layer soap solution was homogeneous, clear and dark brown in color. It was allowed to cool to about 70° C. and was diluted with 12 liters of hot water having a temperature of about 70° C. The diluted soap solution was allowed to cool to room temperature (25° C.) and, after standing for about 4 hours, the precipitate which formed was filtered off and washed with 1 liter of a mixture of 1 part of ethanol and 3 parts of water. The filter cake was collected and dried at a temperature of 70° C. and gave 119 grams of product, corresponding to a yield of 11.9%, as based on the tall oil pitch. The product was a grayish-white powder, having a melting point of 115–125° C., a hydroxyl value of 130, and a sterol content of 72% (by digitonin precipitation).

In Examples 1 and 2 using 1000-gram batches, the saponification was carried out in a 5-liter, three-neck flask equipped with a heating mantle, a glass agitator, reflux condenser and thermometer. The dilution step, however, was carried out in a five-gallon crock. Slow cooling of the hot diluted mixture is normally required for the growth of a good filtering precipitate which is soft and fluffy.

*Example 3*

A mixture of 500 pounds of tall oil pitch, 168 gallons of special denatured ethanol and 180 pounds of potassium hydroxide (85%) was placed in a closed-steam-jacketed kettle equipped with an agitator and a reflux condenser and agitated for from 7 to 8 hours at a temperature of about 50–55° C. The clear, dark, homogeneous solution was then diluted in the same kettle with 720 gallons of hot water having a temperature of about 70° C. and allowed to cool slowly to 20–24° C. and then permitted to stand from 24 to 36 hours. The precipitate of crude sterols which formed was collected and filtered off, conditions causing packing being avoided, washed first with a mixture of 15 gallons of special denatured ethanol and 45 gallons of water and then with 45 gallons of water at 25° C., and finally dried at 70–80° C. 51 pounds of crude sterols were produced, corresponding to a yield of 10.2%. The hydroxyl value was 148.

*Example 4*

The procedures set forth in Example 3 were followed, although on a small scale using only 4 kilograms of tall oil pitch and corresponding decreases in the amounts of the other materials used. The yield was 13.2% (528 grams) of crude sterols and the product had a hydroxyl value of 148. One variation employed in this example was the use of a purification step of the hot aqueous soap solution by bleaching with a suitable decolorizing agent, such as 3% "Darco," followed by a hot filtering step prior to the gradual cooling and crystallization.

The dilution with hot water following the saponification should be at a sufficiently high temperature above room temperature, such as at least 40° C., so that the solution will slowly cool to 20–24° C. over a reasonable length of time to facilitate the formation of a crystalline precipitate with good filtering characteristics. The proportion of hot diluting water to soap solution should be within the range of from about 2:1 to about 5:1, with the optimum proportion being approximately 3:1. If the amount of diluting water is too small, then there will be an incomplete precipitation of the sterols, whereas if the amount of diluting water is too great, the possibility of contamination with an oily material is created.

*Example 5*

The general procedures set forth in Example 2 were substantially followed with the following reactants:

|  | Grams |
|---|---|
| Tall oil pitch | 200 |
| Potassium hydroxide | 74 |
| Water | 200 |
| Isopropanol | 400 |

The saponification took place at about 130° C. and under a pressure of 60 lbs. gauge for a period of approximately two hours. The clear, dark brown, homogeneous solution was then diluted at 98° C. with 2 liters of hot water and allowed to cool slowly to room temperature (25° C.). The filtration was excellent and the yield was good.

*Example 6*

The general procedures set forth in Example 1 were followed with the only change being the use of isopropanol in place of the ethanol in the caustic potash solution. The saponification temperature range and the reaction time were similar. The filtration was excellent and the yield was good.

*Example 7*

Several of the above-described examples were carried out using sodium hydroxide in place of the potassium hydroxide. In all cases, two-layer separations occurred and the principles of the present inventive concept could not be carried out further. Varying conditions were tried but all were unsuccessful.

*Example 8*

Two hundred grams of tall oil pitch was saponified with an excess of aqueous potassium hydroxide (74 g. KOH; 200 g. H₂O) at reflux (130° C.) and a relatively clear soap solution was formed. However, the sterol-containing precipitate which formed on cooling, after dilution with 2000 g. H₂O at 95° C., was almost impossible to filter because of a slimy material accompanying the sterol.

The quantity of hot diluting water is naturally within a critical range inasmuch as solubility, precipitation and crystallization factors are present. The ratio of water:reaction mixture may be as low as 2:1 and may be as high as 5:1, with the preferred ratio being 3:1. Failure to keep within such a range will result in such a decrease of the product as to render the process commercially impracticable.

Upon a comparison of the product of the methods of this invention and the product resulting from methods employing solvent extraction of saponified tall oil pitch, it was established that the crystallized, precipitated sterols resulting from the procedures of this invention were much more readily purified than the solvent-extracted products.

When it is desired to free the crude sterols of such impurities as color bodies and chloroform-insoluble materials, such may be readily accomplished by recrystallization processes as follows: 300 grams of the crude sterols resulting from any of the previously described examples is dissolved in 2400 ml. of ethylene dichloride by refluxing for three hours. The solution is then cooled to 55° C., agitated at that temperature for about 30 minutes after the addition of a filtration aid and then filtered hot, and washed with ethylene dichloride at 70° C. The combined filtrates are diluted with 6000 ml. of methanol, agitated with a small quantity of a decolorizing agent and filtered and washed with ethylene dichloride and methanol. The combined filtrates are concentrated to about 40% of their original volume, cooled to 25° C. and filtered and washed with methanol. The combined filtrates are concentrated to about one-third of their original volume, cooled to 25° C. and filtered; the cake being washed with methanol. The two filter cakes are dried at 50° C. and combined. The yield was 230 grams (76.7%) of fine white crystals having a melting point of 120–125° C. and a sterol content of 74% (digitonin precipitation). The solubility in chloroform was complete.

Other materials, such as benzene-methanol and toluene-methanol, may also be used in such recrystallization processes by following very similar procedures as set forth in the preceding paragraph.

Although we have described but a few specific examples of our invention, we consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

We claim:

1. The method of recovering sterols from tall oil pitch which comprises saponifying tall oil pitch with an alcoholic potassium hydroxide solution comprising a water-soluble aliphatic monohydroxy alcohol having at least two carbon atoms and at least 20% excess potassium hydroxide with respect to the tall oil pitch; diluting the reaction mixture with hot water having a temperature of at least 40° C. but less than the boiling point of the reaction mixture, said hot water being added in a water:reaction mixture ratio of from about 2:1 to about 5:1 gradually cooling the diluted reaction mixture whereby the sterols precipitate out of solution; and separating the precipitated sterols from the cooled diluted reaction mixture.

2. The method as defined in claim 1 wherein the alcohol used in preparing the potassium hydroxide solution is ethanol.

3. The method as defined in claim 1 wherein the alcohol used in preparing the potassium hydroxide solution is isopropanol.

4. The method of recovering sterols from tall oil pitch which comprises saponifying tall oil pitch with an alcoholic potassium hydroxide solution at a temperature from about 20° C. up to the boiling point of the reaction mixture, said alcoholic solution comprising an alcohol having from two to six carbon atoms and at least 20% excess potassium hydroxide with respect to the tall oil pitch; diluting the reaction mixture with hot water having a temperature of at least 40° C., but less than the boiling point of the reaction mixture, said hot water being added in a water:reaction mixture ratio of from about 2:1 to about 5:1; gradually cooling the diluted reaction mixture whereby the sterols precipitate out of solution; and separating the precipitated sterols from the cooled diluted reaction mixture.

5. The method as defined in claim 4 wherein the alcohol used in preparing the potassium hydroxide solution is ethanol.

6. The method as defined in claim 4 wherein the alcohol used in preparing the potassium hydroxide is isopropanol.

7. The method of recovering sterols from tall oil pitch which comprises saponifying tall oil pitch with an alcoholic potassium hydroxide solution at a temperature of from about 20° C. up to the boiling point of the reaction mixture, said alcoholic solution comprising an alcohol having from two to six carbon atoms and at least 20% excess potassium hydroxide with respect to the tall oil pitch; diluting the reaction mixture with hot water having a temperature of at least 40° C. but less than the boiling point of the reaction mixture, said hot water being added in a water:reaction mixture ratio of from about 2:1 to about 5:1; filtering the hot diluted reaction mixture; gradually cooling the same whereby the sterols crystallize and precipitate out of solution; and separating the precipitated sterols from the cooled diluted reaction mixture.

8. The method of recovering sterols from tall oil pitch which comprises saponifying tall oil pitch with an alcoholic potassium hydroxide solution at a temperature of approximately 50–55° C., said alcoholic solution comprising an alcohol having from two to six carbon atoms and containing approximately 150% excess potassium hydroxide with respect to said tall oil pitch; diluting the reaction mixture with approximately three times its weight of hot water having a temperature of about 70° C.; gradually cooling the diluted reaction mixture approximately to room temperature whereby the sterols crystallize and precipitate out of solution; filtering the cooled, diluted reaction mixture to separate the sterols therefrom; and washing the sterols with a 3:1 water:alcohol solution.

9. The method of recovering sterols from tall oil pitch which comprises saponifying tall oil pitch with an ethanolic potassium hydroxide solution at a temperature of approximately 50–55° C., said ethanolic solution containing approximately 150% excess potassium hydroxide with respect to said tall oil pitch; diluting the reaction mixture with approximately three times its weight of hot water having a temperature of about 70° C.; gradually cooling the diluted reaction mixture approximately to room temperature whereby the sterols crystallize and precipitate out of solution; filtering the cooled diluted reaction mixture to separate the sterols therefrom; and washing the sterols with a 3:1 water:alcohol solution.

10. The method of recovering sterols from tall oil pitch which comprises saponifying tall oil pitch with an isopropanolic potassium hydroxide solution at a temperature of approximately 50–55° C., said isopropanolic solution containing approximately 150% excess potassium hydroxide with respect to said tall oil pitch; diluting the reaction mixture with about three times its weight of hot water having a temperature of about 70° C.; filtering the hot diluted reaction mixture; gradually cooling the same to room temperature approximately whereby the sterols crystallize and precipitate out of solution; filtering the cooled diluted reaction mixture to separate the sterols therefrom; and washing the sterols with a 3:1 water:alcohol solution.

References Cited in the file of this patent

UNITED STATES PATENTS

| | | |
|---|---|---|
| 1,912,440 | Frey | June 6, 1933 |
| 2,591,885 | Smith | Apr. 8, 1952 |
| 2,619,495 | Christenson | Nov. 25, 1952 |

FOREIGN PATENTS

| | | |
|---|---|---|
| 547,324 | Great Britain | 1942 |